(12) United States Patent
Kim et al.

(10) Patent No.: US 12,477,207 B2
(45) Date of Patent: Nov. 18, 2025

(54) APPARATUS FOR INSPECTING APPEARANCE OF SECONDARY BATTERY

(71) Applicant: ENSCAPE CO., LTD., Seongnam-si (KR)

(72) Inventors: Nam Dong Kim, Suwon-si (KR); Sang Sik Min, Hwaseong-si (KR); Won Young Jeong, Suwon-si (KR); Jae Hyuk Choi, Gimpo-si (KR); Jin Hyeok Ko, Seoul (KR); Yong Deong Kang, Seongnam-si (KR); Sang Baek Kim, Seongnam-si (KR)

(73) Assignee: ENSCAPE CO., LTD., Seongnam-si (KR)

( * ) Notice: Subject to any disclaimer, the term of this patent is extended or adjusted under 35 U.S.C. 154(b) by 353 days.

(21) Appl. No.: 18/051,817

(22) Filed: Nov. 1, 2022

(65) Prior Publication Data

US 2023/0345106 A1    Oct. 26, 2023

(30) Foreign Application Priority Data

Apr. 25, 2022 (KR) .................. 10-2022-0050997
Aug. 18, 2022 (KR) .................. 10-2022-0103627

(51) Int. Cl.
*H04N 23/58* (2023.01)
*H04N 5/265* (2006.01)
(Continued)

(52) U.S. Cl.
CPC ............ *H04N 23/58* (2023.01); *H04N 5/265* (2013.01); *H04N 23/55* (2023.01); *H04N 23/56* (2023.01); *H04N 23/74* (2023.01); *H04N 23/90* (2023.01)

(58) Field of Classification Search
CPC ........ H04N 23/58; H04N 23/56; H04N 23/55; H04N 23/74; H04N 23/90; H04N 5/265;
(Continued)

(56) References Cited

U.S. PATENT DOCUMENTS

| | | | | |
|---|---|---|---|---|
| 6,122,045 A | * | 9/2000 | Pike | ..................... G01B 11/105 348/125 |
| 2008/0225131 A1 | * | 9/2008 | Aoki | ......................... G06T 7/73 348/222.1 |

(Continued)

FOREIGN PATENT DOCUMENTS

| | | |
|---|---|---|
| JP | 2007-017194 A | 1/2007 |
| KR | 10-2011-0018080 A | 2/2011 |

(Continued)

OTHER PUBLICATIONS

The Extended European Search Report for European Patent Application No. 22205074.2, dated Sep. 21, 2023.

*Primary Examiner* — Kathleen V Nguyen

(57) ABSTRACT

The appearance inspection apparatus for a secondary battery according to the disclosure can obtain an image corresponding to an area of not less than 180 degrees of a lateral surface of the secondary battery when the secondary battery is captured at a first posture, and obtain an image corresponding to the entire lateral surface of the secondary battery when the secondary battery is captured at a second posture, thereby having an effect on significantly improving inspection speed.

15 Claims, 23 Drawing Sheets

(51) Int. Cl.
*H04N 23/55* (2023.01)
*H04N 23/56* (2023.01)
*H04N 23/74* (2023.01)
*H04N 23/90* (2023.01)

(58) Field of Classification Search
CPC ............. G01N 21/952; G01N 21/8851; G01N 21/8806
See application file for complete search history.

(56) References Cited

U.S. PATENT DOCUMENTS

| | | | | |
|---|---|---|---|---|
| 2010/0026809 | A1* | 2/2010 | Curry | H04N 23/698 |
| | | | | 348/157 |
| 2018/0172557 | A1* | 6/2018 | Ghidotti Piovan | G06T 7/001 |
| 2020/0064277 | A1* | 2/2020 | Hucker | G01N 21/9515 |
| 2023/0003708 | A1* | 1/2023 | Wallet | G01N 33/24 |
| 2024/0405301 | A1* | 12/2024 | Kim | G01N 21/952 |

FOREIGN PATENT DOCUMENTS

| | | | |
|---|---|---|---|
| KR | 10-1030449 | * | 4/2011 |
| KR | 10-1030449 B1 | | 4/2011 |
| KR | 10-2386324 B1 | | 4/2022 |
| WO | 01/94922 A1 | | 12/2001 |

\* cited by examiner

APPARATUS FOR INSPECTING APPEARANCE OF SECONDARY BATTERY

CROSS REFERENCE TO RELATED APPLICATION

This application claims the benefit of Korean Patent Applications No. 10-2022-0050997 filed on Apr. 25, 2022 and No. 10-2022-0103627 filed on Aug. 18, 2022 in the Korean Intellectual Property Office, the disclosure of which is incorporated by reference herein in its entirety.

BACKGROUND OF THE INVENTION

Field of the Invention

The disclosure relates to an apparatus for inspecting the appearance of a secondary battery.

Description of the Related Art

A secondary battery refers to a battery that supplies electric power to the outside by converting chemical energy into electrical energy, and receives and stores external power from the outside, when discharged, by converting electrical energy into chemical energy. With development of electronic devices, the secondary battery is being applied to various apparatuses in various fields.

Such a secondary battery is produced in various shapes. As one of various shapes, a cylindrical shape is applied to the secondary battery like a cylindrical battery that has been generally used and is still widely used.

A cylindrical secondary battery has a curved lateral surface, and therefore a method of inspecting the outer appearance of the cylindrical secondary battery while rotating the cylindrical secondary battery 360 degrees is generally used.

An appearance inspection apparatus for the cylindrical secondary battery has been disclosed in Korean Patent No. 1030449 (published on Apr. 25, 2011).

However, such a conventional inspection method has a problem of a low inspection efficiency because one or two cameras are used in inspecting one battery in order to inspect the lateral surface of the battery.

SUMMARY OF THE INVENTION

An aspect of the disclosure is to provide an apparatus for inspecting the appearance of a secondary battery so as to solve the foregoing problems of a low inspection efficiency in a conventional inspection apparatus for the secondary battery.

According to an embodiment of the disclosure, there is provided an appearance inspection apparatus for a secondary battery including a lateral inspection module that captures an area including at least a part of an area of a blind spot of a camera through a mirror when a lateral surface of a secondary battery is captured, and generates an inspection image by compositing an image obtained by directly capturing the lateral surface of the secondary battery and an image obtained based on reflection from the mirror.

In addition, according to the disclosure, an appearance inspection apparatus for a secondary battery may include a first lateral inspection module configured to obtain a lateral image of the secondary battery in a first posture, a reverser configured to reverse the posture of the secondary battery from the first posture to a second posture, and a second lateral inspection module configured to obtain the lateral image of the secondary battery in the second posture.

Further, according to the disclosure, an appearance inspection apparatus for a secondary battery may include a lighting unit configured to emit light in various combinations.

Further, according to the disclosure, an appearance inspection apparatus for a secondary battery may include a top inspection module and a bottom inspection module to inspect the top and bottom of the secondary battery, respectively.

Meanwhile, the top inspection module and the bottom inspection module may obtain the images of the top and bottom of the secondary battery by emitting light in various combinations.

DETAILED DESCRIPTION OF THE INVENTION

Figure 1:
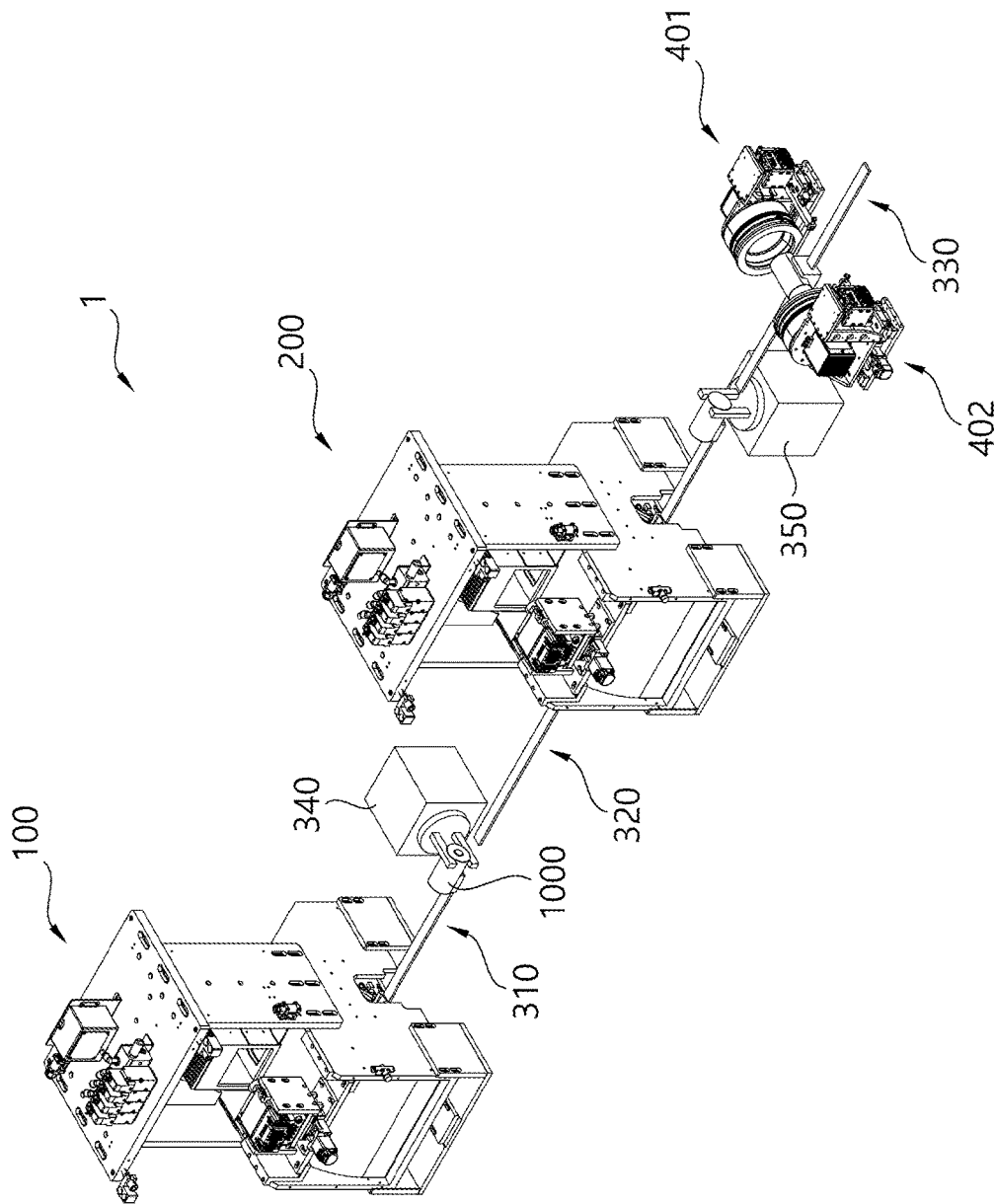
FIG. 1 is a perspective view of an appearance inspection apparatus for a secondary battery according to the disclosure.

Hereinafter, an appearance inspection apparatus for a secondary battery according to embodiments of the disclosure will be described in detail with reference to the accompanying drawings. The names of elements used in the following description may be referred to as other names in the art. However, these elements may be considered as equivalent elements in alternative embodiments as long as they have functional similarity and identity. Further, the reference numerals of the elements are provided for the convenience of description. However, the elements indicated by the reference numerals in the drawings are not limited to the scope shown in the drawings. Similarly, even though some elements in the drawings are modified in alternative embodiments, these elements are considered as equivalent elements as long as they have functional similarity and identity. Further, when elements are regarded as elements that should be naturally included at the level of those skilled in the art, descriptions thereof will be omitted.

In the following, descriptions will be made on the premise that a secondary battery has a cylindrical shape, and a curved surface, an upper surface, and a lower surface in a cylindrical structure will be referred to as a lateral surface, a top, and bottom, respectively. Further, an axis connecting the center of the upper surface and the center of the lower surface will be referred to as a lengthwise axis.

FIG. 1 is a perspective view of an appearance inspection apparatus for a secondary battery according to the disclosure.

Referring to FIG. 1, an appearance inspection apparatus 1 for a secondary battery according to the disclosure may be configured to perform appearance inspection by obtaining images while moving a cylindrical secondary battery to inspection positions.

The appearance inspection apparatus 1 for the secondary battery according to the disclosure may include ae lateral inspection module, a transport, a reverser, and top and bottom inspection modules 402.

The lateral inspection module is configured to perform the appearance inspection by obtaining the images of the lateral surface of the secondary battery.

The lateral inspection module may include a first lateral inspection module 100 and a second lateral inspection module 200. To obtain an image of the lateral surface of the secondary battery having a curved surface, the images of the secondary battery need to be taken from various angles. In this case, the secondary battery may be rotated with respect to the lengthwise axis in order to change the angle. However, when the size of the secondary battery is large, its moment of inertia becomes greater and thus it may take some time to change the posture. Therefore, according to the disclosure, the lateral inspection module turns the battery around a widthwise axis to change the posture.

Each of the first lateral inspection module 100 and the second lateral inspection module 200 is configured to take images corresponding an area of not less than 180 degrees in the lateral surface of the secondary battery once. To this end, each of the first lateral inspection module 100 and the second lateral inspection module 200 may include a mirror. However, even in this case, it is necessary to change the posture in order to obtain the image of the entire lateral surface of the secondary battery. According to the disclosure, an image of the lateral surface of the secondary battery is obtained by the first lateral inspection module 100 while the secondary battery is seated in a first posture. Then, the secondary battery is turned over by a first reverser 340 so that its posture can be changed from the first posture to a second posture, and transported to the second lateral inspection module 200 so that an image of the remaining lateral surface can be obtained.

The transport is configured to transport the secondary battery. The transport may include a plurality of transports respectively including seats for the secondary battery, in which each seat may be movable along a given path on a guide rail. The transport may include a first transport 310, a second transport 320, and a third transport 330. Meanwhile, the guide rails respectively included in the transports may be connected on an external base, and this configuration is omitted for convenience of description.

The first transport 310 is configured to transport the secondary battery to the first lateral inspection module 100, and then transport the secondary battery from the first lateral inspection module 100 to the first reverser 340 after the image of the lateral surface of the secondary battery is obtained primarily.

The second transport 320 is configured to transport the secondary battery, the posture of which is reversed, from the first reverser 340, to the second lateral inspection module 200, and then transport the secondary battery from the second lateral inspection module 200 to a second reverser 250 after the image of the lateral surface of the secondary battery is obtained secondarily.

The third transport 330 is configured to transport the secondary battery from the second reverser 350 to the top and bottom inspection positions.

Meanwhile, the first to third transports 310 to 330 may include various actuation elements and sensors for actuating the transport. However, known elements may be used as such elements, and therefore detailed descriptions thereof are omitted.

The reverser is configured to change the posture of the secondary battery for the purpose of the appearance inspection. The reverser may include the first reverser 340 and the second reverser 350. The first reverser 340 is provided between the first lateral inspection module 100 and the second lateral inspection module 200, and configured to change the posture of the secondary battery by turning the secondary battery around the widthwise axis.

The second reverser 350 may change the arrangement angle of the secondary battery with respect to a vertical axis so that the posture of the secondary battery that has completed the lateral inspection can be changed for the top and bottom inspections.

The first reverser 340 may include a first gripper module, and a first rotation actuator for angle change. Likewise, the second reverser 350 may include a second gripper module, and a second rotation actuator for angle change.

The top and bottom inspection modules 402 may be configured to obtain top and bottom images of the secondary battery.

The top and bottom inspection modules 402 may include a top inspection module 401 configured to inspect the top of the secondary battery, and a bottom inspection module 402 configured to inspect the bottom of the secondary battery.

The image processor may be configured to process the obtained image and determine whether a defect is present or not. In particular, the image processor may divide the image obtained by the lateral inspection module into an area obtained by directly capturing the secondary battery and an area obtained by reflection from the mirror, perform image correction for each area, and composite the areas into one image. After generating an inspection image based on one composite lateral image, it is possible to check a defect in an outer appearance of the secondary battery. In this case, a plurality of inspection images are obtained according to various lighting combinations of lateral lighting units (to be described later), and the image processor determines a defect in each inspection image, thereby finally determining whether there is a defect.

Below, the configurations and functions of the lateral inspection module will be described in detail with reference to FIGS. 2 to 11. Meanwhile, the configurations and functions of the lateral inspection module to be described below may be equally applied to the first lateral inspection module 100 and the second lateral inspection module 200. Therefore, the configurations of the first lateral inspection module 100 will be representatively described.

Figure 2:
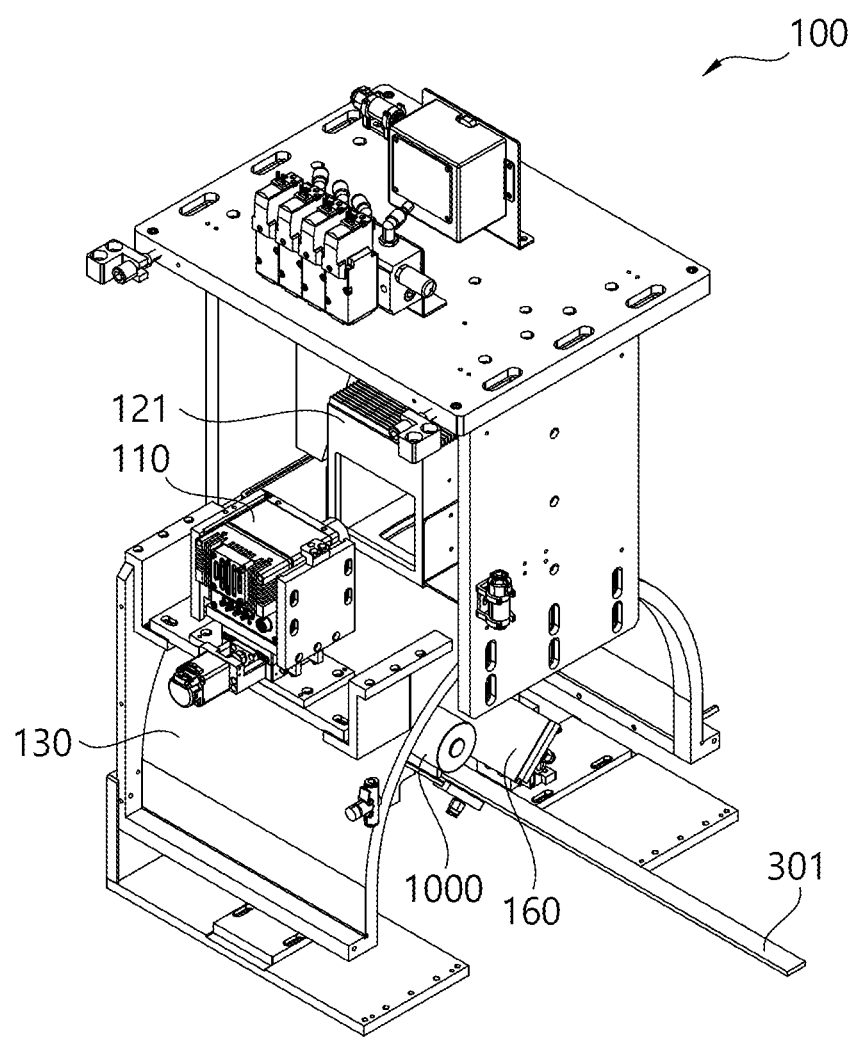
FIG. 2 is a cut-open perspective view of a lateral inspection module.
Figure 3:
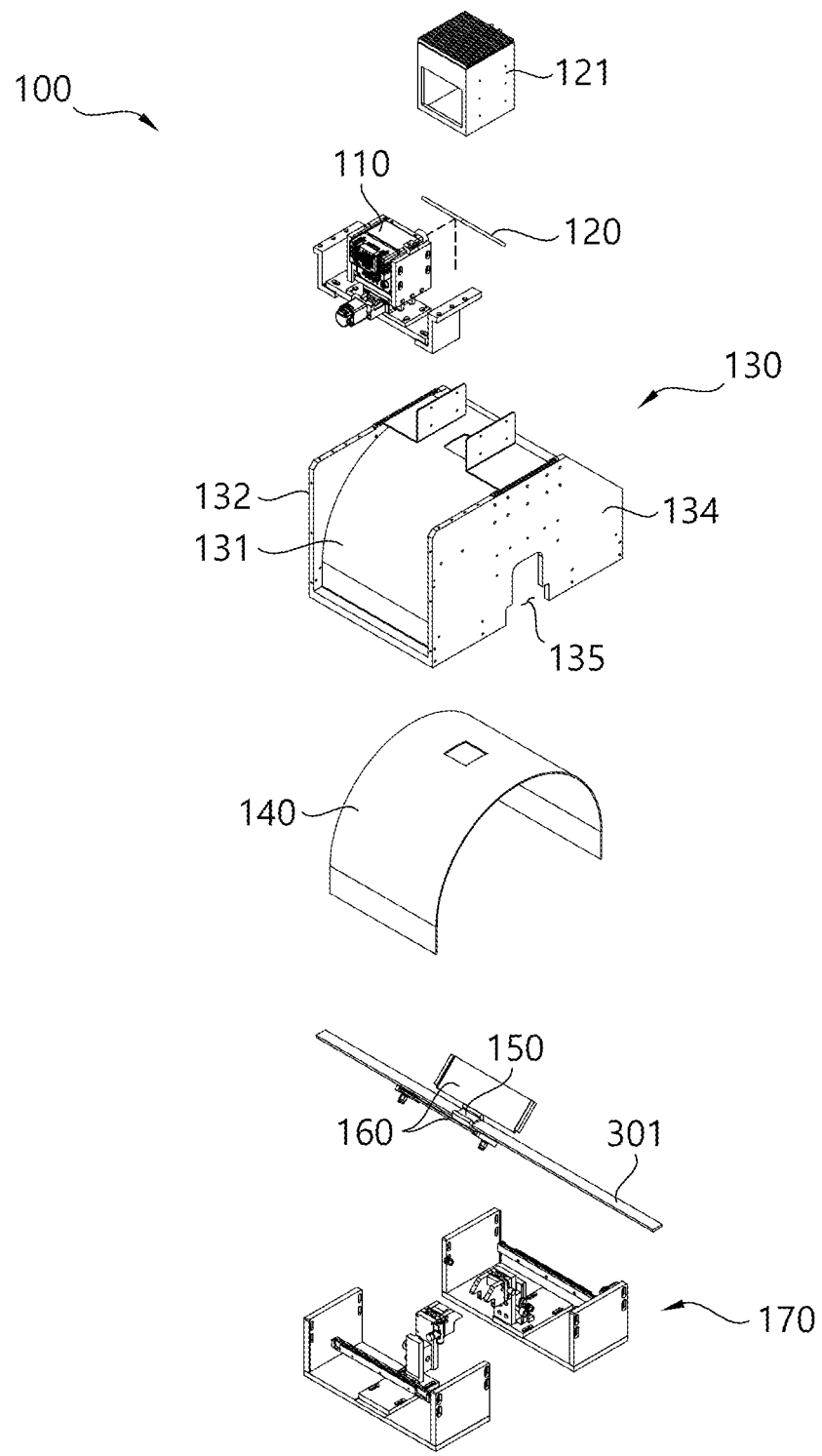
FIG. 3 is an exploded perspective view of a lateral inspection module.

FIG. 2 is a cut-open perspective view of the lateral inspection module, and FIG. 3 is an exploded perspective view of the lateral inspection module.

Referring to FIGS. 2 and 3, the lateral inspection module 100 may include a lateral camera 110, an optical path converter 120, a casing 130, a lateral lighting unit, a seat 150, a mirror 160, and a mirror supporter 170.

The lateral camera 110 is configured to obtain an image of a secondary battery 1000 seated in the casing 130 (to be described later). The lateral camera 110 is configured to have an adjustable focus, so that a focal distance can be adjusted reflecting a difference between an optical path of when the secondary battery 1000 is directly captured, and a optical path of when the secondary battery 1000 is captured using the mirror 160 (to be described later). The lateral camera 110 is disposed to form an optical axis in a horizontal direction, and the optical axis may be formed in a vertical direction through the optical path converter 120 (to be described later). This configuration may lower the height than that of when the lateral camera 110 is disposed in a vertical direction.

The optical path converter 120 is provided inside an optical path converter holder 121 above the casing 130, and configured to convert the path of the optical axis of the lateral camera 110. For example, the optical path converter 120 may be provided as a beam splitter or the like element, and may be disposed at an angle of 45 degrees to the horizontal direction. The optical path converter 120 may be provided above the casing 130, formed with openings in directions toward the lateral camera 110 and toward the inside of the casing 130 below, and configured not to cause interference with light directed from the seat 150 toward the camera.

The casing 130 is configured to allow the secondary battery 1000 to seat therein, and minimize the effects of external light damage while the secondary battery 1000 is captured. The casing 130 is configured to make the secondary battery 1000 be illuminated therein while minimizing the introduction of external light. The casing 130 may include a side wall 131, an inlet wall 132, and an outlet wall 134.

The side wall 131 may be formed as a curved surface extending in a circumferential direction of the secondary battery 1000 approximately with respect to an axis parallel to the lengthwise direction of the secondary battery 1000 seated in the seat 150. The uppermost end of the side wall 131 may connect with the optical path converter holder 121, and formed with the opening through which light is allowed to pass. The inlet wall 132 is formed to have an approximately flat surface, and close a rear end portion of the side wall 131. The outlet wall 134 is formed to have an approximately flat surface, be symmetrical to the inlet wall 132, and close a front end portion of the side wall 131. Here, the front refers to a direction in which the secondary battery 1000 is transported.

The casing 130 may include a lower side connected to an external base, and an inner side in which the first transport is disposed. The first transport may be positioned to pass through the lower sides of the inlet wall 132 and the outlet wall 134. Meanwhile, the inlet wall 132 may be formed with an inlet cut to have a predetermined size, and the outlet wall 134 may be formed with an outlet having the same size as the inlet. The inlet and outlet may be sized to allow the seat 150 and the secondary battery 1000 moving on the first transport to enter and exit.

The lateral lighting unit may be formed on the inner surface of the side wall 131 of the casing 130. In this case, the lateral lighting unit may include a plurality of lighting modules according to front and rear positions. Each lighting module may be configured to operate selectively. The lateral lighting unit may operate with various combinations of lighting modules according to preset patterns in such a manner that the plurality of lighting modules are operated as a whole, the lighting modules spaced apart from each other are selectively operated, or some rows of the plurality of light modules are operated simultaneously.

The seat 150 is provided in the transport, and configured to seat the secondary battery 1000 thereon. The seat 150 is configured to move on a guide rail 301 of the transport, and configured to, together with the secondary battery 1000, enter and exit the casing 130 via the inlet and outlet of the casing 130. The seat 150 may be formed to have a concave upper surface to accommodate a convex lateral surface of the secondary battery 1000 so that the lateral surface of the secondary battery 1000 can be supported upward and held by its own weight.

The mirror 160 is configured to allow the lateral camera 110 to take at least a part of an image corresponding to a blind area formed in a lower half when the lateral camera 110 takes an image of the secondary battery 1000 seated on the seat 150. The mirrors 160 may form a pair as provided at opposite lateral surfaces of the secondary battery 1000 with respect to the seat 150. The pair of mirrors 160 may be disposed as inclined at an angle of about 40 to 60 degrees from a vertically upward direction while facing each other. In other words, the pair of mirrors 160 may be symmetrically provided with respect to the secondary battery 1000 seated on the seat 150.

The mirror supporter 170 is configured to support the mirror 160, and may include a first side connected to the mirror 160 and a second side connected to the base. Further, the mirror supporters 170 may form a pair to support the mirrors 160, respectively.

Figure 4:
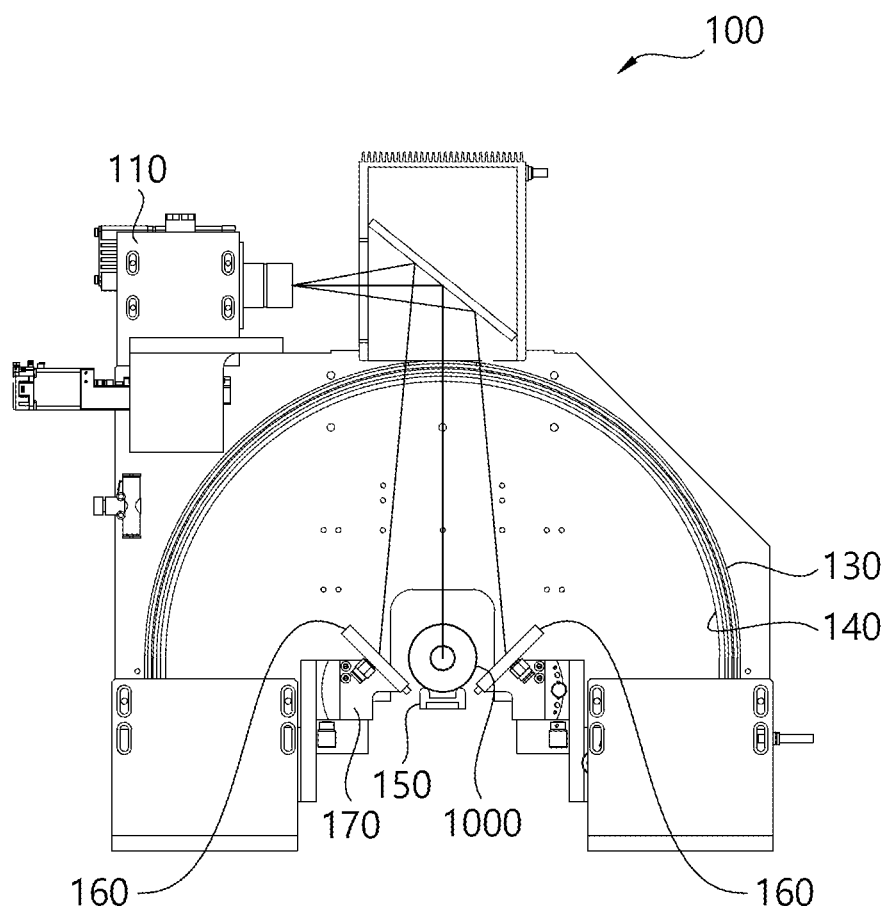
FIG. 4 is a cross-sectional view of a lateral inspection module.

FIG. 4 is a cross-sectional view of a lateral inspection module.

Referring to FIG. 4, the secondary battery is positioned at a central lower side of the casing as it is transported in a lengthwise direction. In this case, the mirrors 160 coupled to the mirror supporters 170 and spaced apart at a predetermined distance from the opposite lateral surfaces of the secondary battery 1000 are configured to change the optical path so as to take an image of a part of the lower half surface of the secondary battery 1000. The lateral camera 110 may take an image at the lateral surface of the casing by the optical path converter 120, and the viewing angle of the lateral camera 110 may be configured to cover an area for directly capturing the secondary battery 100 and the mirrors 160. Meanwhile, as described above, there is a need for adjusting the focal distance of the lateral camera is because the optical path is changed when the image is obtained through the mirror. In this case, the lighting unit 140 provided in the casing 130 emits light toward the inside of the casing 130, and the lateral camera 110 takes the image while the secondary battery 1000 is being illuminated.

Figure 5:
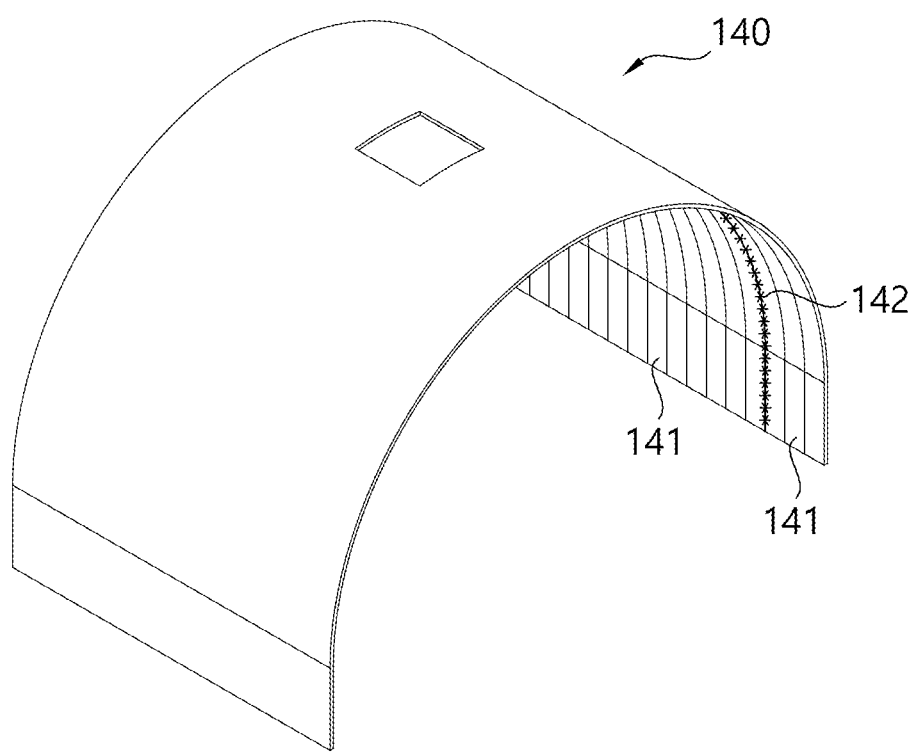
FIG. 5 is a view illustrating a lighting unit of a lateral inspection module.

FIG. 5 is a view illustrating the lighting unit of the lateral inspection module.

Referring to FIG. 5, the lateral lighting unit 140 of the lateral inspection module may be provided on the inner surface of the casing, and may include the light emitting modules arranged in a plurality of rows in the front and rear directions. Each row of the light emitting modules is arranged along the curved surface of the casing, and the rows are configured to operate independently of each other. In this case, light emitting modules 142 to be activated and light emitting modules 141 to be inactivated may be selected by a controller.

Figure 6A:
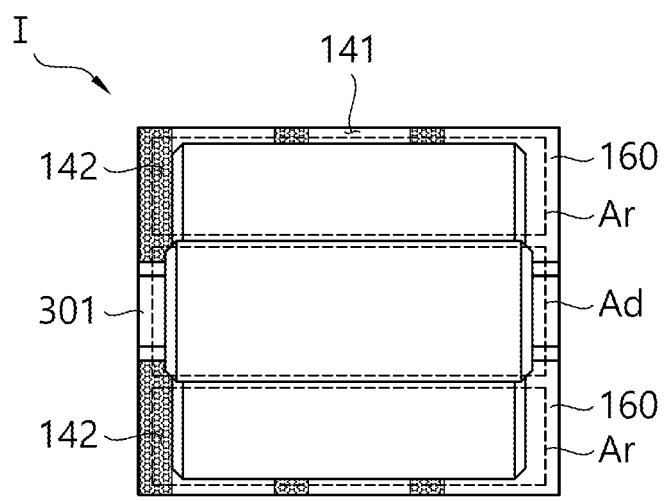
FIGS. 6A, 6B and 6C are views illustrating the concept of captured images and combination of light emitting modules in a lateral inspection module.
Figure 6B:
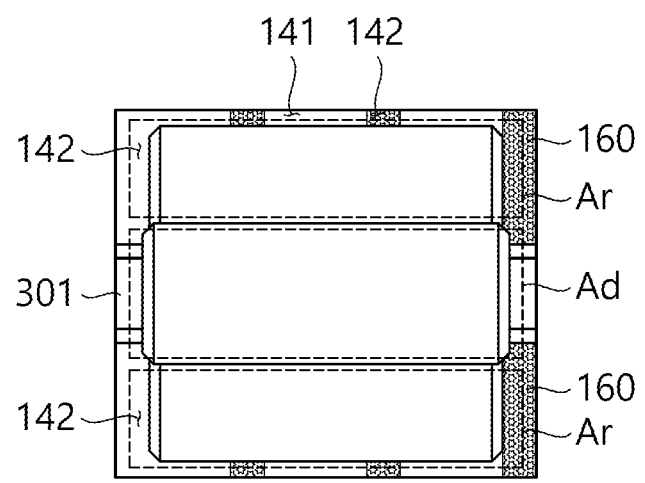
Figure 6C:
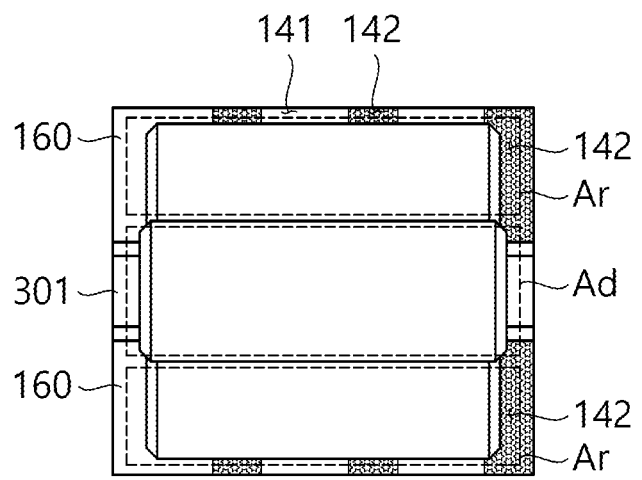

FIGS. 6A, 6B and 6C are views illustrating the concept of captured images and combinations of the light emitting modules in the lateral inspection module.

Referring to FIGS. 6A, 6B and 6C, the images of the secondary battery, which are obtained being illuminated with different combinations of the light emitting modules operating in the lateral lighting unit, are shown. In this case, the operating state of the lateral lighting unit may be checkable based on the images reflected from the pair of mirrors 160 provided at the lateral surfaces of the secondary battery 1000. In other words, both the light emitting modules 142 being activated and the light emitting module 141 being inactivated of the lighting unit provided substantially above the mirrors 160 may be checked in the area where the mirrors 160 are checked. Further, the guide rail 301 and the base may be partially checked along with the light emitting modules, but such an area including the guide rail 301 and the base is not used in the appearance inspection for the secondary battery. Referring to FIG. 6A, in a first combination of the activated light emitting modules, a predetermined number of rows of light emitting modules from the left in the drawing are activated, and light may be emitted from three areas spaced apart from each other like bands separated from each other. In this case, the lateral camera may obtain an image of the secondary battery when the light emitting modules are activated in the first combination. In this case, the obtained image includes both the area Ad of directly capturing the secondary battery 1000 and the blind area Ar based on the reflection of the mirror 160.

Referring to FIG. 6B, the lateral camera may obtain an image of the secondary battery when the light emitting modules are activated in a second combination. In this case, the light emitting modules activated in the second combination may operate at positions more shifted rightward in the drawing than those activated in the first combination. Referring to FIG. 6C, the light emitting modules may be activated in a third combination, and an image of the second battery may be obtained in this case. In the third combination, the number of consecutively activated rows of light emitting modules is more than that in the first combination or the second combination, and a light emitting area in this case may be wider than that in the previous combinations. However, this operation is merely an example, and a lot of combinations of light emitting modules may be selected to emit the light. As described above, the lateral lighting unit is varied in angle, quantity of light, and light emitting position, and therefore a shading difference due to a defect physically formed on the outer appearance of the secondary battery may be found, thereby improving a detection rate of a defect.

Figure 7:
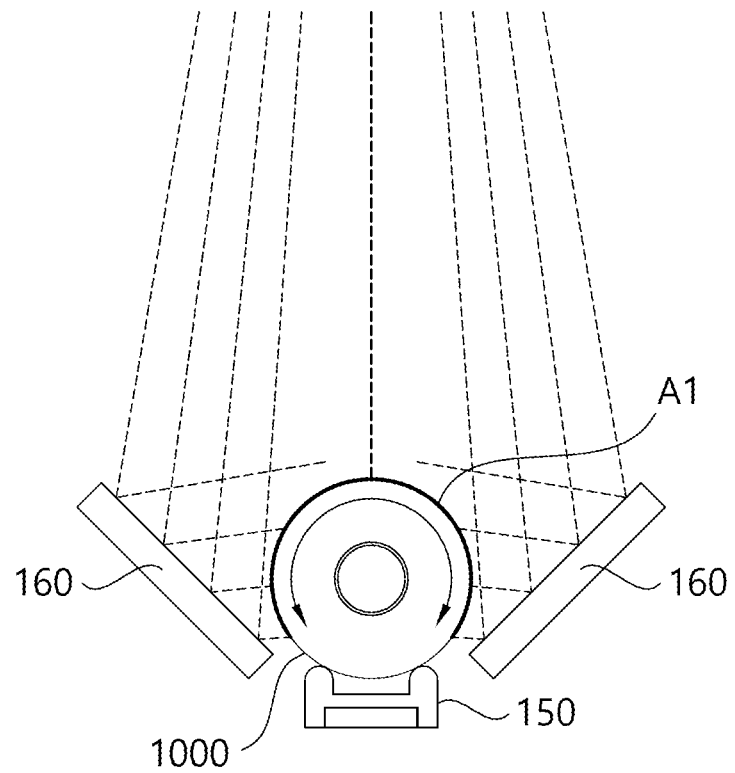
FIG. 7 is an operational state view illustrating the concept of capturing a lateral surface of a secondary battery in a first lateral inspection module.

FIG. 7 is an operational state view illustrating the concept of capturing the lateral surface of the secondary battery in the first lateral inspection module. In this drawing, descriptions will be made on the premise that the secondary battery 1000 is transported from the outside to the inside of the first lateral inspection module and positioned on the seat 150.

Referring to FIG. 7, when images of the secondary battery 1000 are obtained from above the secondary battery 1000, an image of an upper half surface of the secondary battery 1000 may be directly obtained by the lateral camera. Further, the lateral camera may obtain an image of an area including a blind spot reflected by the pair of mirrors 160. Meanwhile, in this case, the width of the transport may be determined to correspond to the area of not more than 150 degrees within the circumference of the secondary battery 1000 in order to prevent interference with the optical path when the image based on the reflection of the mirror 160 is taken. Therefore, the transport is not shown in the image taken by the lateral camera. Meanwhile, an area A1 taken by the lateral camera once may be obtained as an image of about 200 to 300 degrees, including the directly captured upper half surface of about 180 degrees and the areas captured by both mirrors 160. However, a plurality of mirrors 160 may be used to secure an image corresponding to a wider area. Although the number and arrangement of mirrors 160 are changed, it is impossible to take an image of the entire lateral surface, i.e., corresponding to 360 degrees, of the secondary battery 1000 once, and thus there is a need of taking an additional image. This additional image may be taken by the second lateral inspection module.

Figure 8A:
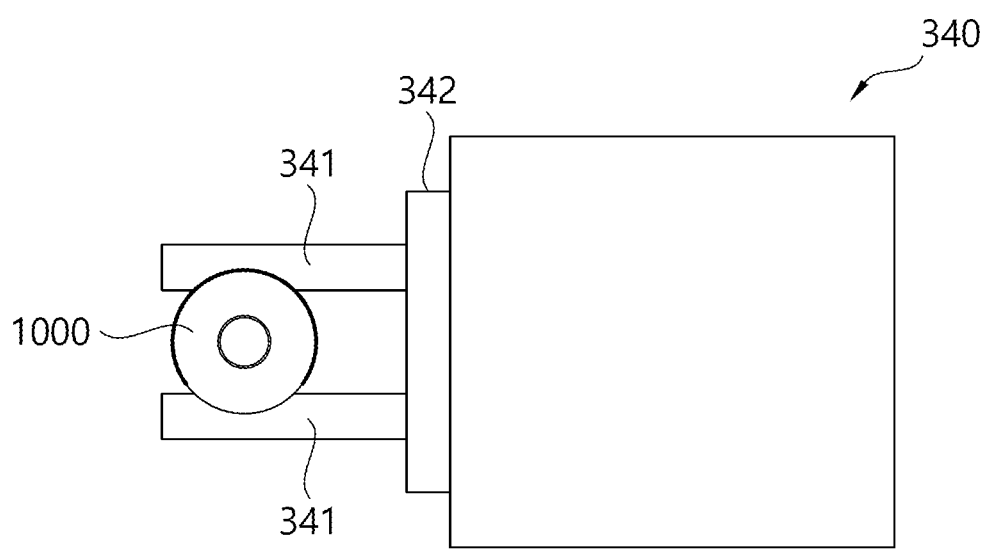
FIGS. 8A and 8B are views illustrating operations of a first reverser.
Figure 8B:
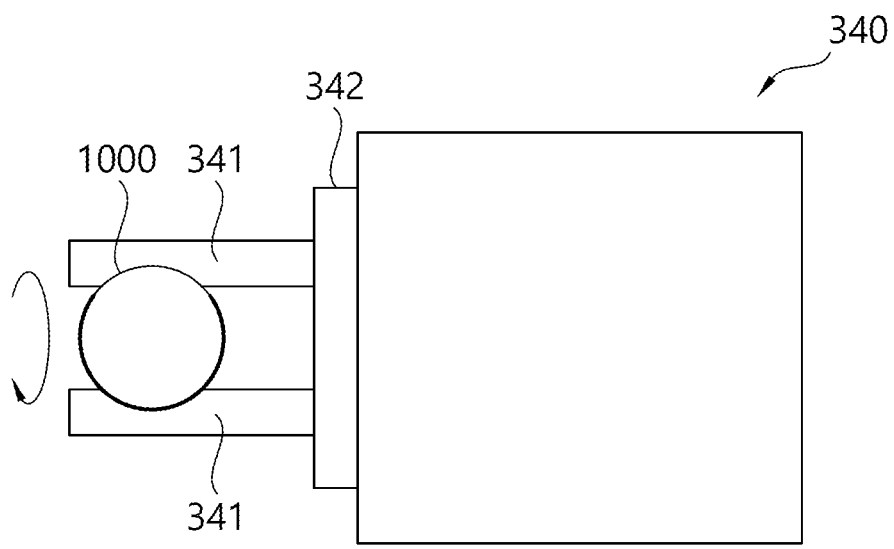

FIGS. 8A and 8B are views illustrating operations of a first reverser.

After the image is taken once by the first lateral inspection module, the first transport transports the secondary battery up to a position adjacent to the first reverser 340 in the lengthwise direction. Then, the first reverser 340 grips the secondary battery in the widthwise direction of the secondary battery by narrowing a space between first grippers 341 as shown in FIG. 8A, and rotates a first rotation actuator 342 as shown in FIG. 8B to reverse the top and bottom of the secondary battery so that the first posture can be switched over to the second posture. Then, the first reverser 340 seats the secondary battery in the second transport. When the secondary battery is seated, the second transport moves in the lengthwise direction and transports the secondary battery toward the inside of the second lateral inspection module, thereby transporting the secondary battery to an inspection position.

Figure 9:
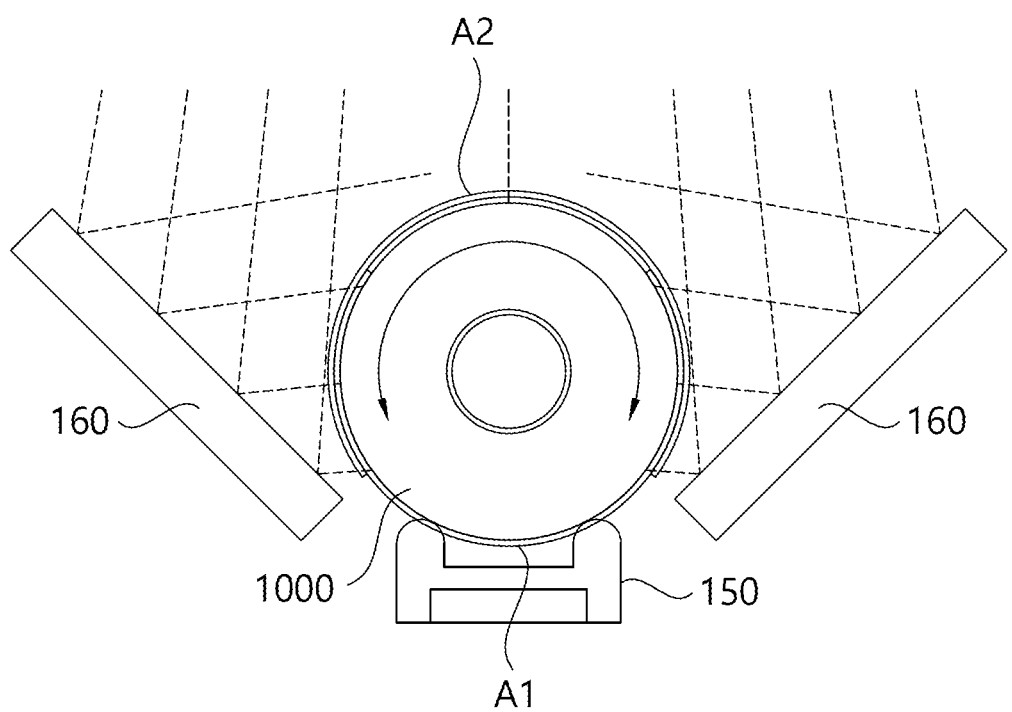
FIG. 9 is an operational state view illustrating concept of capturing a lateral surface of a secondary battery in a second lateral inspection module.

FIG. 9 is an operational state view illustrating concept of capturing the lateral surface of the secondary battery in the second lateral inspection module.

Referring to FIG. 9, like the first lateral inspection module, the second lateral inspection module obtains an image including an area directly showing the secondary battery and a blind area based on the reflection of the mirror.

In this case, the area to be captured in the lateral surface of the secondary battery 1000 is an area A2 of not less than 180 degrees in the state that the lower half surface not captured in the first lateral inspection module is switched over to the upper half surface in the second posture. In other words, the image including not only the area of directly capturing the secondary battery but also the blind area based on the reflection of the mirror 160 is obtained even in the second lateral inspection module.

Figure 10:
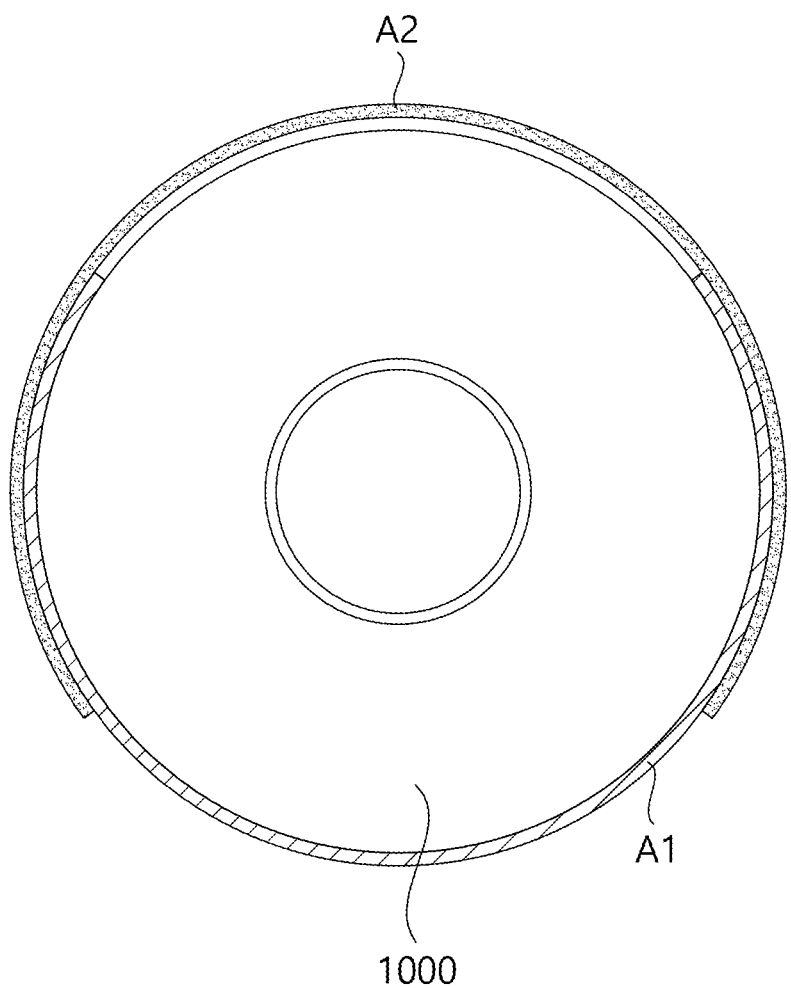
FIG. 10 is a view illustrating the concept of areas of a lateral surface captured by a first lateral inspection module and a second lateral inspection module.

FIG. 10 is a view illustrating the concept of the areas of the lateral surface captured by the first lateral inspection module and the second lateral inspection module.

Referring to FIG. 10, the area captured by the first lateral inspection module is the area A1 of not less than 180 degrees in the lateral surface of the secondary battery 1000, and the area A2 captured by the second lateral inspection module is also not less than 180 degrees and is determined to be vertically symmetrical to the area captured by the first lateral inspection module.

Figure 11A:
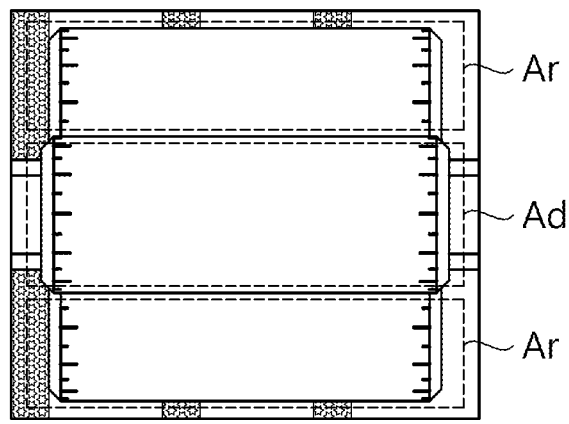
FIGS. 11A and 11B are views illustrating the concept of generating an inspection image by an image processor.
Figure 11B:
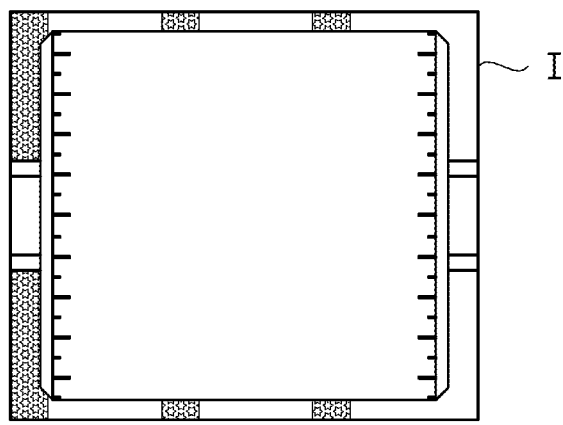

FIGS. 11A and 11B are views illustrating the concept of generating an inspection image by the image processor. For convenience of description, FIG. 11 shows that scales are marked at regular intervals along the circumferential direction of the secondary battery.

Referring to FIG. 11A, the image processor may generate an inspection image by processing a plurality of obtained images. In this case, the viewing angle of the lateral image of the cylindrical secondary battery are becomes smaller from normal direction of side surface. Therefore, it becomes more difficult to obtain an accurate image as getting closer to the edge in the lateral direction on the image. In this case, the area Ar based on the reflection of the mirror shows the same results as the secondary battery is captured from a different angle because its optical axis is converted from that of the area Ar of directly capturing the secondary battery.

Referring to FIG. 11B, the image processor corrects the first area Ad captured directly, reverses the second area Ar captured using the mirror, and corrects distortion, thereby generating a single continuous image. Finally, images of not less than 180 degrees of the lateral surface of the secondary battery is converted into a plane, and thus an inspection image I of which distortion is corrected is generated. The generation of such an inspection image may be performed with respect to the plurality of images obtained with different lighting combinations in the first lateral inspection module and the second lateral inspection module.

Meanwhile, an image processing algorithm for generating the foregoing inspection image has been widely used, and thus detailed descriptions thereof will be omitted.

Figure 12:
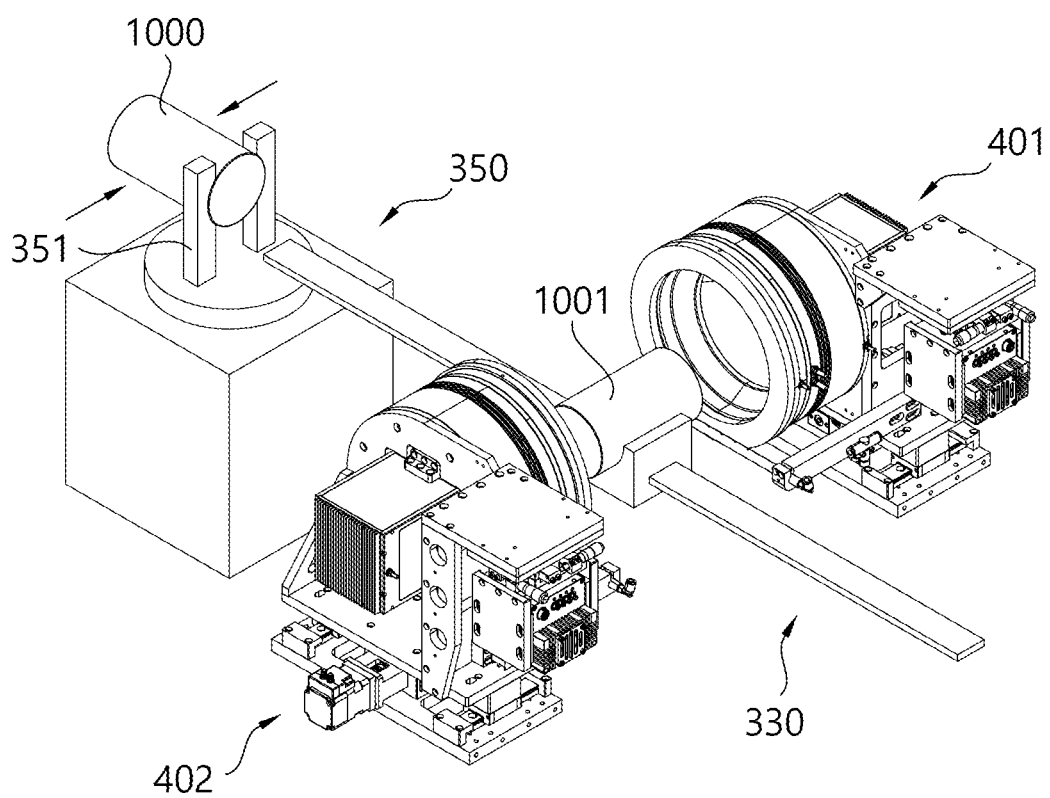
FIG. 12 is a conceptual view illustrating the concept of posture change in a secondary battery based on operations of a second reverser and operations of transporting a secondary battery to a third transport.

FIG. 12 is a conceptual view illustrating the concept of posture change in a secondary battery based on operations of a second reverser and operations of transporting a secondary battery to a third transport.

Referring to FIG. 12, the second transport transports the secondary battery 1000 toward the second reverser 350 after the inspection for the lateral surface of the secondary battery is completed. In this case, the second reverser 350 picks up the secondary battery and is preparing to transport the secondary battery to the third transport 330.

Meanwhile, the inspections for the top and bottom of the secondary battery may be consecutively performed, and at this time the top and bottom of the previously transported secondary battery 1001 may be undergoing the inspection.

In the foregoing embodiments, the lateral surface of the secondary battery was inspected by two lateral inspection modules. However, the disclosure is not limited to the foregoing embodiments. Alternatively, one lateral inspection module may be enough to inspect the lateral surface of the secondary battery when an element for rotating or reversing the secondary battery seated on the seat is additionally provided.

Below, the top and bottom inspection modules according to the disclosure will be described with reference to FIGS. 13 to 19.

Figure 13:
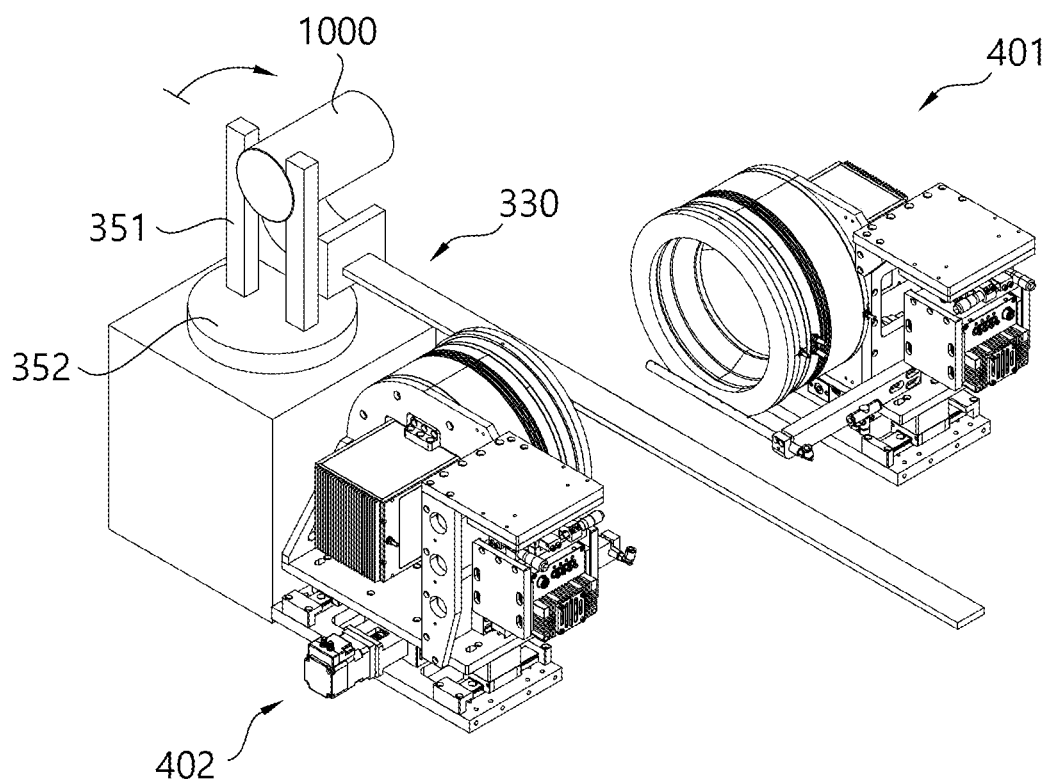
FIG. 13 is a view illustrating a second reverser, a third transport, and top and bottom inspection modules.

FIG. 13 is a view illustrating a second reverser, a third transport, and top and bottom inspection modules.

Referring to FIG. 13, the secondary battery is taken out of the second lateral inspection module in its lengthwise direction after the lateral image inspection is completed. In this case, a second gripper 351 of a second reverser 350 operates to grip the secondary battery in a lateral direction, and a second rotation actuator 352 rotates the secondary battery by 90 degrees in a horizontal angle. In this case, after the secondary battery is rotated by 90 degrees, the second reverser may be additionally controlled to horizontally move on the base so that the secondary battery can be stably seated on the third transport, or the gripper may be biased toward a first side on the rotation actuator so that the posture of the secondary battery can be adjusted in a horizontal direction. Eventually, the transport direction of the secondary battery may be switched over from the lengthwise direction to the widthwise direction by the second reverser 350. Then, the secondary battery 1000 may be transported to the top and bottom inspection positions by the third transport 330.

The top inspection module 401 and the bottom inspection module 402 may be configured to obtain images of the top and bottom while the secondary battery is being loaded into the transport. The top inspection module and the bottom inspection module may be disposed in directions opposite to each other and disposed facing toward the secondary battery positioned therebetween.

The second reverser 350 may be variously configured to change the posture of the secondary battery. The second reverser 350 may have various configurations such as a hand capable of picking up and rotating the secondary battery, and an element capable of rotating the secondary battery at a predetermined angle while supporting the lower portion of the secondary battery.

However, the second reverser 350 may be omitted when a part of a path along which the secondary battery is transported by the transport is perpendicular to a direction in which the secondary battery is taken out of the second lateral inspection module. In other words, the second reverser 350 may be omitted when the posture of the secondary battery is finally changeable by the third transport 330 without using the second reverser 350, or when the secondary battery is disposed at a position to be inspected by the top inspection module and the bottom inspection module without changing the posture of the secondary battery. For example, when the posture of the secondary battery is maintained but the transport direction of the third transport 330 is changed by 90 degrees to the widthwise direction, the secondary battery may be transported to a position where its top and bottom images are smoothly obtainable even through the second reverser is omitted.

Figure 14:
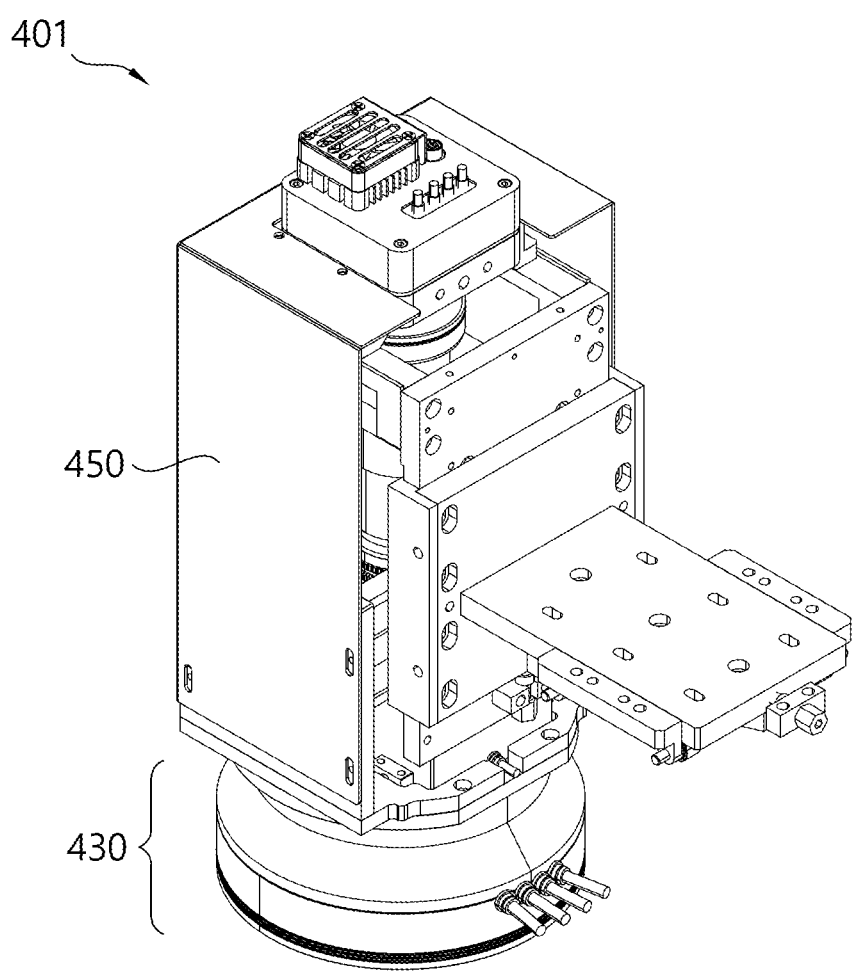
FIG. 14 is a perspective view of a top inspection module.
Figure 15:
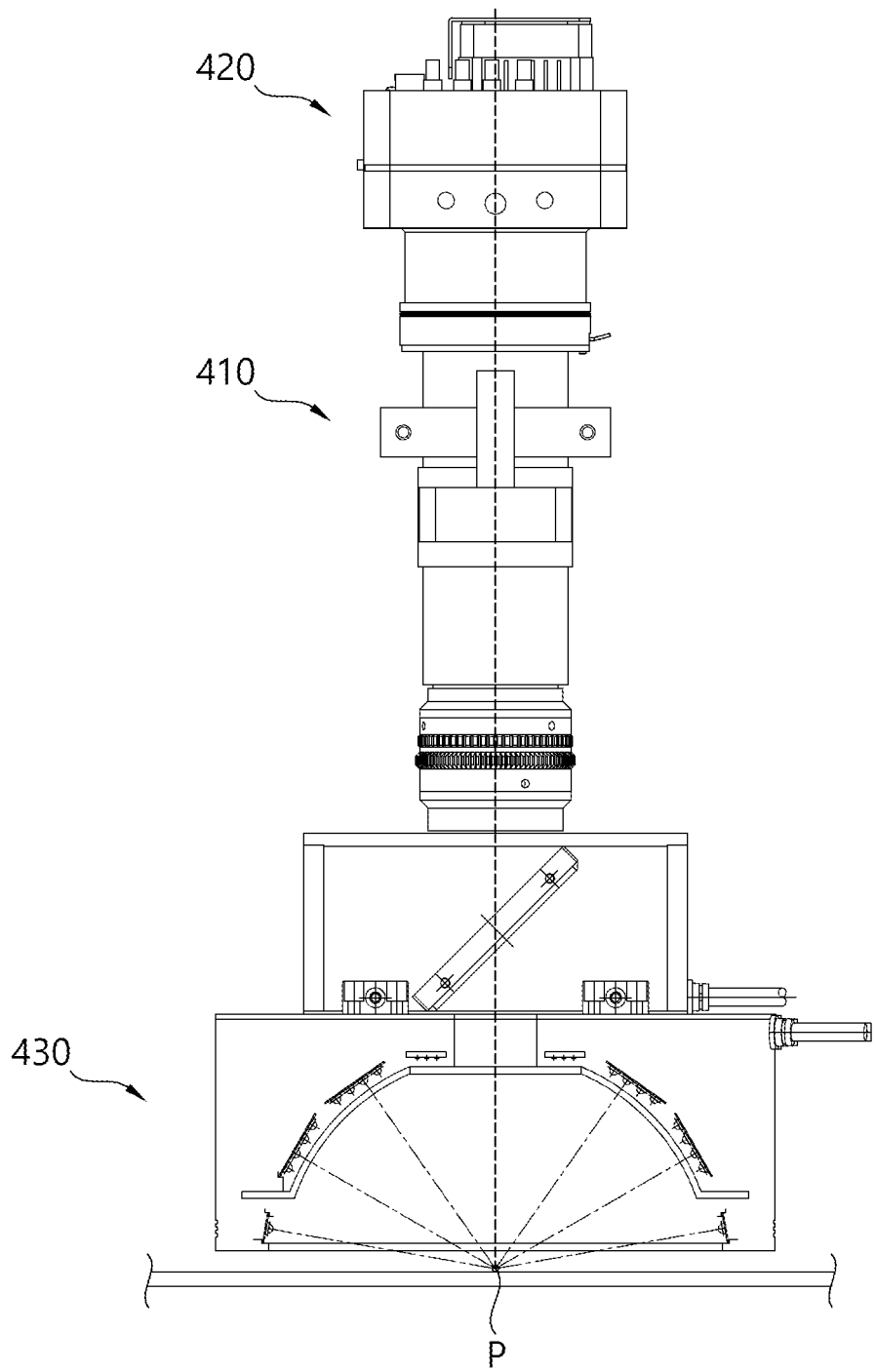
FIG. 15 is a cross-sectional view illustrating an optical axis of a top inspection module according to the disclosure.

FIG. 14 is a perspective view of the top inspection module, and FIG. 15 is a cross-sectional view of the top inspection module according to the disclosure. Meanwhile, the bottom inspection module may have the same configurations as the top inspection module. To avoid repetitive descriptions, only the top inspection module 401 will be representatively described below without the description of the bottom inspection module 402.

Referring to FIG. 14, the top inspection module 401 may include a top lighting unit 430 provided at a lower side, and a top camera. The top camera and the top lighting unit of the top inspection module may be arranged vertically, and configured to obtain an image by capturing the top of the secondary battery positioned at a lower side.

Referring to FIG. 15, the top inspection module may be disposed to have an optical axis in parallel with a horizontal direction, i.e., the lengthwise axis when the secondary battery is disposed at the inspection position P by the transport. In this case, the top inspection module may be disposed so that the center of the top surface of the secondary battery can be positioned on the optical axis. Although it is not shown, the bottom inspection module may be disposed in the opposite direction to the top inspection module with the secondary battery therebetween, and positioned to obtain an image while facing the bottom of the secondary battery.

Below, the configurations and functions of the top inspection module 401 will be described in detail with reference to FIGS. 16 to 19.

Figure 16:
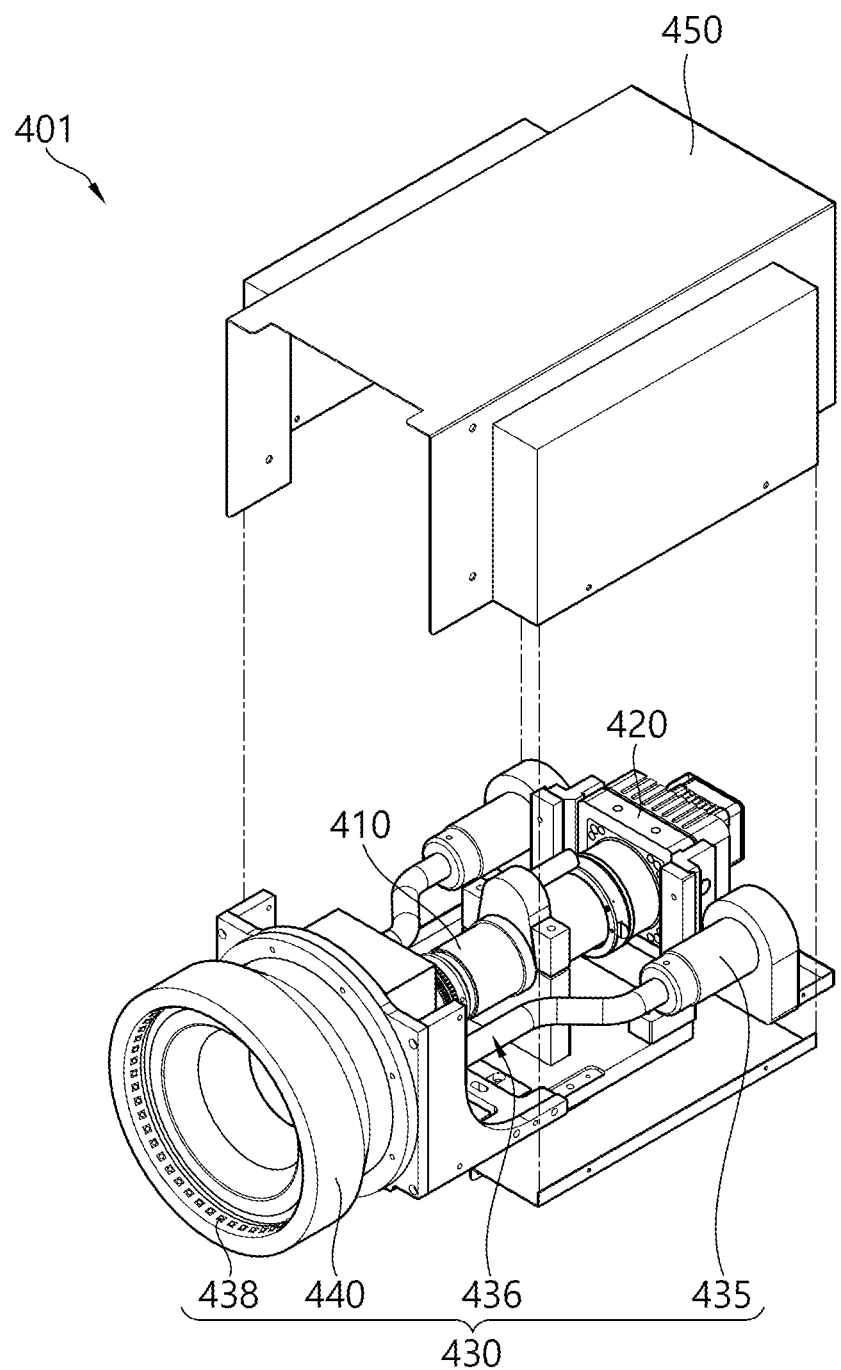
FIG. 16 is a partial exploded perspective view of a top inspection module.
Figure 17:
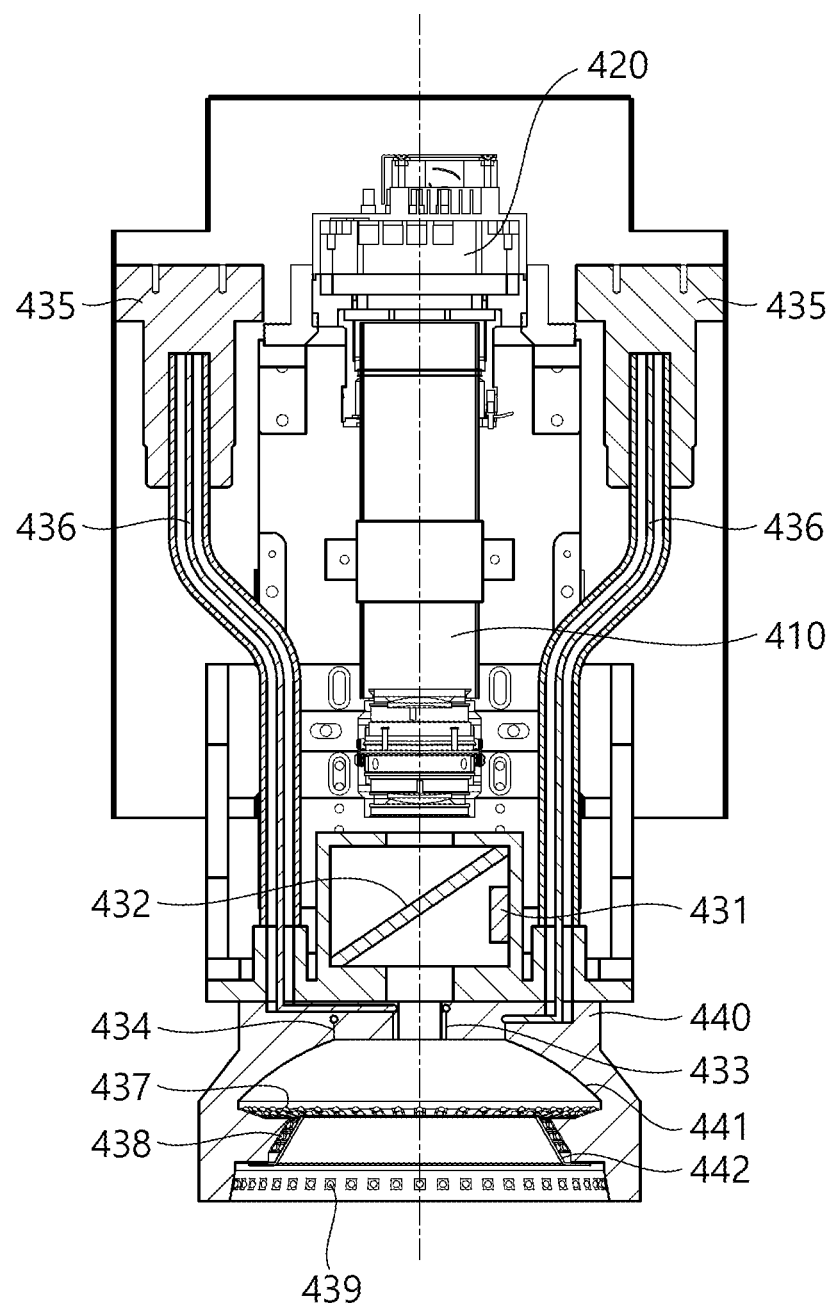
FIG. 17 is another cross-sectional view of the top inspection module.
Figure 18:
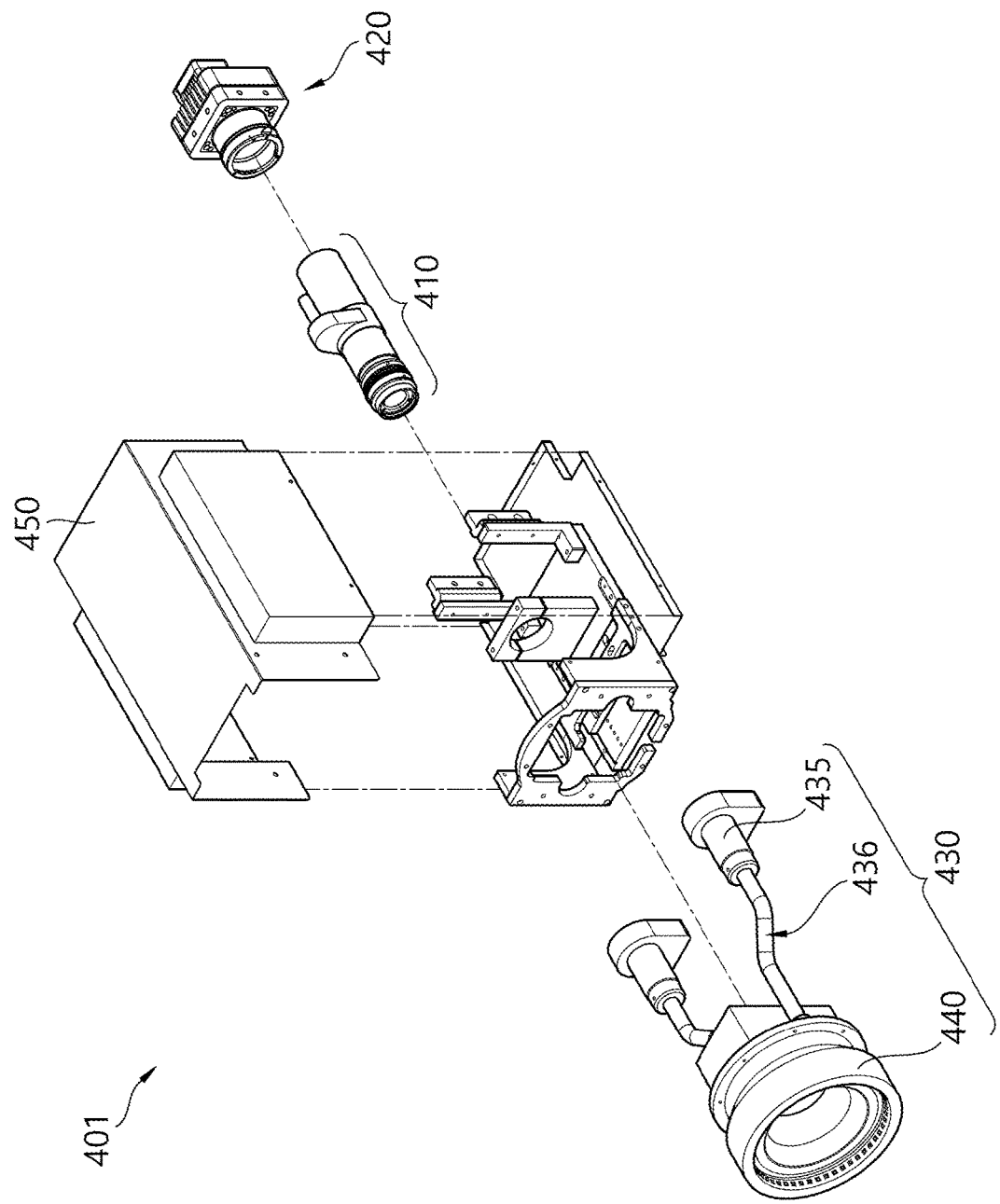
FIG. 18 is an exploded perspective view of a top inspection module.
Figure 19:
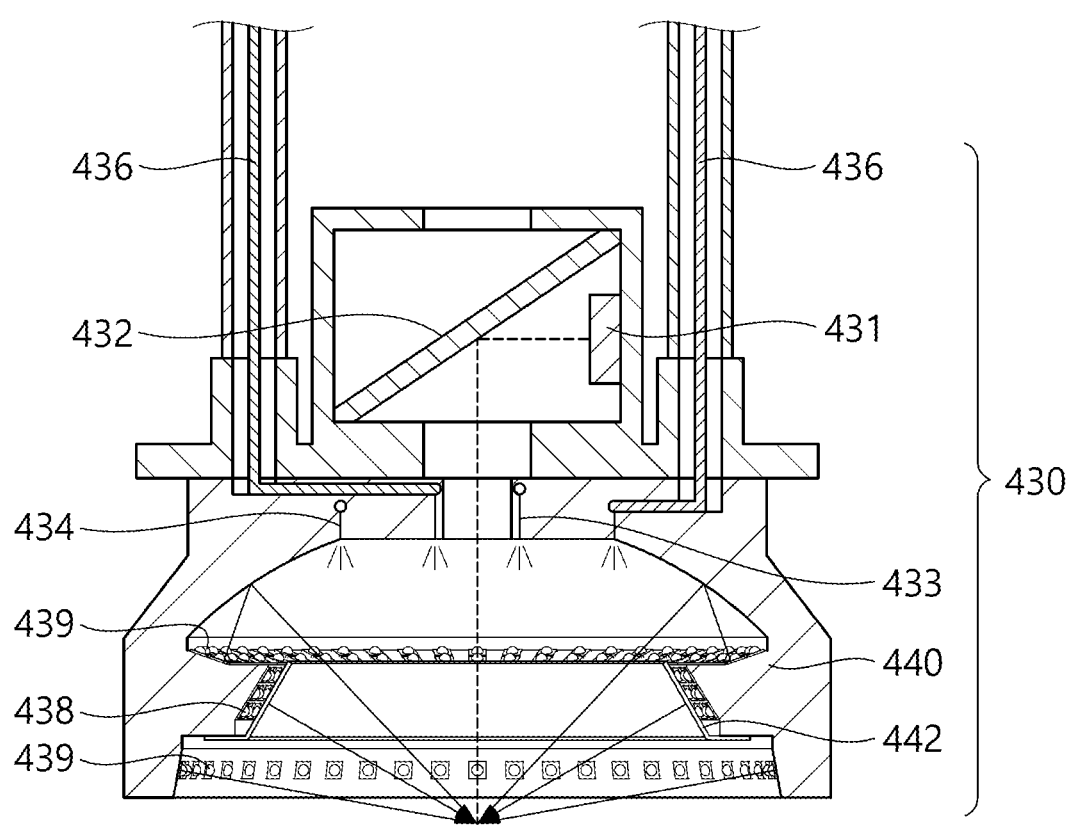
FIG. 19 is a cross-sectional view of a top lighting unit.

FIG. 16 is a partial exploded perspective view of the top inspection module 401, FIG. 17 is a cross-sectional view of the top inspection module, FIG. 18 is an exploded perspective view of the top inspection module, and FIG. 19 is a cross-sectional view of the top lighting unit.

Referring to FIGS. 16 to 19, the top inspection module 401 may be configured to obtain an image at an inspection position spaced apart by a predetermined distance on the optical axis. Meanwhile, the bottom inspection module 402 may have the same configuration as the top inspection module 401, but may be disposed to have a capturing direction opposite to that of the top inspection module 401. The top inspection module 401 may be configured to obtain an image while emitting light to the inspection position, and may also be configured to obtain an image while changing a focal distance.

The top inspection module 401 may include a lens module 410, an image sensor module 420, and a top lighting unit 430, and a casing 450 enclosing the lens module 410 and the image the sensor module 420.

The lens module 410 is configured to change a focal length when obtaining an image of a subject, i.e., an object placed at the inspection position. The lens module 410 may include one or more lens kits. The lens is configured to change the focal length, and may for example include a polymer lens. In the case of including the polymer lens, the lens is varied in shape depending on an external force, thereby adjusting the focal length. In this case, a focal length adjuster (not shown) may be configured to change the shape of the polymer lens by transmitting a force to the polymer lens.

The image sensor module 420 may be configured to generate an electrical signal by capturing a subject. However, the image sensor module 420 may employ a widely used configuration, and thus more detailed descriptions thereof will be omitted.

The top lighting unit 430 may be configured to emit various types of light to an object. The object is made of various materials and has various shapes, and thus there may be a defect that is not detectable with a certain type of lighting due to its optical characteristics such as reflectivity and shadow. Therefore, the top lighting unit 430 emits various types of light, which are optically different in illumination angle, amount, etc. to check whether a defect is present in the outer appearance, thereby improving the accuracy in detecting the presence of the defect.

The top lighting unit 430 may include a plurality of light sources to emit various types of light. For example, the top lighting unit 430 may include a lighting frame 440, a coaxial lighting unit 431, a fiber lighting unit 433, a dome lighting unit 437, and inclined lighting units 438 and 439. The top lighting unit 430 may be configured to generally have rotational symmetry with respect to the optical axis. Further, the plurality of lighting units provided in the top lighting unit 430 is divided according to a plurality of areas along a rotational direction, and their operations are determined independently of each other. For example, the areas may be divided at intervals of 90 degrees along a rotational direction with respect to the optical axis. Alternatively, as necessary, the lighting units may be provided in two areas divided at intervals of 180 degrees and controlled to emit light.

The lighting frame 440 serves as a base in which various lighting units (to be described later) may be provided. The lighting frame 440 may be shaped like a cone, the radius of which becomes larger toward the inspection position, and has a first side adjacent to the lens module 410 and a second side adjacent to the inspection position. The lighting frame 440 may be formed with a hollow having a predetermined diameter in a center portion thereof to form the optical path. The lighting frame 440 may be shaped to have rotational symmetry with respect to the foregoing optical axis.

Meanwhile, the lighting frame 440 may be internally provided with at least two cutting surfaces on which the lighting units may be disposed at various angles. The at least two cutting surfaces are different in angle to the inspection position, so that the lighting units disposed on the cutting surfaces can emit light to the inspection position at different angles to each other. Meanwhile, the lighting frame 440 may be provided with a dome-type reflective surface 441 at one side thereof. The dome-type reflective surface 441 is configured to reflect light emitted from the dome lighting unit 437 (to be described later) to the inspection position.

The coaxial lighting unit 431 is configured to emit light along the same optical axis as an optical axis for obtaining the image by the second camera 420. The coaxial lighting unit 431 may be provided at one side of the foregoing lighting frame 440, and configured to emit light in a direction perpendicular to the foregoing optical axis.

A beam splitter 432 may be provided at a point where the optical path of the coaxial lighting unit 431 meets the optical axis of the lens module 410. The beam splitter 432 may be configured to pass light directed from the inspection position to the lens module 410 but reflect light emitted from the coaxial lighting unit 431 toward the inspection position.

The fiber lighting unit 433 may include a light source 435 at one side thereof to generate a larger amount of light than other lighting units, and a plurality of optical fibers penetrating the lighting frame 440 from the light source 435 and having one end exposed to the inside. The plurality of optical fibers 436 arranged along one circular path may be connected as a bundle to the light source 435.

The fiber lighting unit 433 may include a first fiber lighting unit 433 and a second fiber lighting unit 434 which are different in diameter of circular paths on which the ends thereof are disposed. Here, the first fiber lighting unit 433 and the second fiber lighting unit 434 refer to portions of the optical fiber bundles, which are exposed to the lighting frame 440 on the circular paths. The first fiber lighting unit 433 may be disposed along a circular path having a smaller diameter than that of the second fiber lighting unit 434.

The first fiber lighting unit 433 and the second fiber lighting unit 434 may be connected to the light sources 435 capable of generating a large amount of light, respectively. Referring to FIG. 20, for example, two light sources 435 are provided at left and right sides of the lens module 410, and transmit light to the first fiber lighting unit 433 and the second fiber lighting unit 434 through the plurality of optical fibers 436. Therefore, light may be selectively emitted along circular paths different in diameter from each other. However, the arrangement and number of optical fibers 436 are merely an example, and may be modified and applied in various numbers and combinations.

The dome lighting unit 437 is configured to emit light to the foregoing dome-type reflective surface 441, and may be disposed along a circular path. The light is emitted from the dome lighting unit 437 in a direction opposite to the inspection position, and reflected from the dome-type reflective surface 441 to the inspection position.

The inclined lighting units 438 and 439 are configured to emit light obliquely toward the inspection position. The inclined lighting units 438 and 439 may include a first inclined lighting unit 438 and a second inclined lighting unit 439 to emit light at different angles to the inspection position.

The first inclined lighting unit 438 may be configured to emit light at a greater angle to the inspection position than that of the second inclined lighting unit 439. The first inclined lighting unit 438 and the second inclined lighting unit 439 may be provided on the cutting surfaces having different inclinations on the lighting frame 440, respectively. The first inclined lighting unit 438 and the second inclined lighting unit 439 are configured to form circular paths along the cutting surfaces, and emit light while surrounding the inspection position. Meanwhile, a translucent plate 442 adjacent to the first inclined lighting unit 438 and made of a semi-transmissive material may be provided so that light emitted from the first inclined lighting unit 438 can be output as surface light.

The coaxial lighting unit 431, the dome lighting unit 437, the first inclined lighting unit 438 and the second inclined lighting unit 439 described above may include light emitting diodes (LED). Further, the dome lighting unit 437, the first inclined lighting unit 438, and the second inclined lighting unit 439 may include a plurality of LEDs and be provided on the lighting frame 440 along paths having rotational symmetry.

Meanwhile, the top lighting unit 430 may be controlled to emit light through one or more selected among the coaxial lighting unit 431, the fiber lighting unit 433, the dome lighting unit 437, and the inclined lighting unit, so that the image can be obtained. For example, the image may be obtained with light emitted by operating any one selected from among the lighting units or simultaneously operating a plurality of lighting units.

Meanwhile, as described above, like the top inspection module, the bottom inspection module may include a coaxial lighting unit, a fiber lighting unit, a dome lighting unit, and an inclined lighting unit, and may also include a camera.

As described above, in the appearance inspection apparatus for the secondary battery according to the disclosure, the lateral inspection module can obtain an image of not less than 180 degrees when the image is taken once, and corrects the obtained images to generate a single continuous image, thereby more quickly performing the appearance inspection for the secondary battery. Further, light is emitted in various combinations, thereby more accurately determining a defect in the outer appearance of the secondary battery.

According to the disclosure, an appearance inspection apparatus for a secondary battery obtains an image corresponding to an area of not less than 180 degrees of a lateral surface of the secondary battery when the secondary battery is captured at a first posture, and obtains an image corresponding to the entire lateral surface of the secondary battery when the secondary battery is captured at a second posture, thereby having an effect on significantly improving inspection speed.

What is claimed is:

1. An appearance inspection apparatus for a secondary battery, the apparatus comprising:
a lateral inspection module configured to seat a transported secondary battery therein in a lengthwise lying posture and obtain an image comprising at least a part of a half area directly exposed to a camera and a blind area reflected from a mirror of a lateral surface of the secondary battery;
top and bottom inspection modules provided facing each other at lengthwise opposite sides of the secondary battery at top and bottom inspection positions to which the secondary battery is transported; and
a transport configured to transport the secondary battery between the lateral inspection module and the top and bottom inspection modules,
wherein the lateral inspection module comprises:
a seat configured to seat the secondary battery in a lateral inspection position;
a lateral camera configured to obtain a lateral image of the secondary battery and disposed to form an optical axis in a horizontal direction; and
an optical path converter disposed above the seat and configured to convert a light path along the optical axis of the lateral camera in the horizontal direction to a vertical direction so that the lateral camera obtains the lateral image of the secondary battery seated in the lateral inspection position, and
wherein the mirror is provided as a plurality of mirrors which are disposed symmetrically with respect to the lateral inspection position, and each of the plurality of mirrors is adjacent to the seat, and is configured to convert an optical path for a partial lateral surface corresponding to a blind area of the lateral camera in the lateral surface of the secondary battery seated in the lateral inspection position,
wherein the lateral inspection module comprises:
a first lateral inspection module configured to obtain an image when the secondary battery is seated in a first posture; and
a second lateral inspection module configured to obtain the lateral image when the secondary battery is seated in a second posture reversed from the first posture, and
wherein the apparatus further comprises a reverser provided between the first lateral inspection module and the second lateral inspection module, and configured to rotate the secondary battery transported from the first lateral inspection module about a transverse direction of the secondary battery to reverse the secondary battery, the transverse direction being perpendicular to a lengthwise direction of the transported secondary battery.

2. The apparatus of claim 1, wherein the second lateral inspection module is configured to obtain the lateral image by receiving the reversed secondary battery from the reverser.

3. The apparatus of claim 1, wherein the reverser includes grippers configured to adjust a space therebetween to grip the secondary battery in the transverse direction and a rotation actuator coupled to the grippers and configured to rotate the secondary battery about the transverse direction thereof.

4. The apparatus of claim 1, wherein the lateral inspection module further comprises:
a lateral lighting unit configured to emit light to the secondary battery seated in the lateral inspection position.

5. The apparatus of claim 4, wherein
the lateral inspection module comprises a casing inside which a lateral inspection area is provided, and
the lateral lighting unit is provided on an inner surface of the casing.

6. The apparatus of claim 5, wherein the lateral lighting unit comprises light emitting modules arranged in a plurality of rows along a lengthwise direction of the seated secondary battery.

7. The apparatus of claim 6, wherein the lateral camera is controlled to obtain an image when the lateral lighting unit emits light to the secondary battery by activating a plurality of rows of light emitting modules simultaneously.

8. The apparatus of claim 7, wherein the lateral camera is controlled to obtain a lateral image of the secondary battery whenever the lateral lighting unit switches the activated light emitting modules.

9. The apparatus of claim 7, further comprising an image processor configured to process the image obtained by the lateral camera,
    wherein the image processor is configured to:
    divide the image obtained by the lateral camera into a first area obtained by directly capturing the secondary battery and a second area obtained by capturing based on reflection from the mirror; and
    generate one image by compositing the first area and the second area.

10. The apparatus of claim 7, wherein the seat is configured to support an area corresponding to an angle of not more than 150 degrees within a circumference of the secondary battery.

11. The apparatus of claim 7, wherein the casing comprises an inlet and an outlet via which the secondary battery passes the casing along the lengthwise direction.

12. The apparatus of claim 11, wherein the seat is configured to allow the secondary battery to be seated on a straight line connecting the inlet and the outlet in the lengthwise direction.

13. The apparatus of claim 11, wherein
    the lateral camera is configured to obtain an image corresponding to an upper half surface of the lateral surface of the secondary battery, which is seated in the seat, at an upper side, and
    the mirror is disposed to reflect a part of a lower half surface of the secondary battery seated in the seat so that the image can be obtained at the upper side of the seat.

14. The apparatus of claim 13, wherein
    the lateral camera comprises a lens configured to adjust a focal distance, and
    the lateral camera is configured to adjust a focal distance when obtaining an image of the upper half surface of the secondary battery seated in the seat and when obtaining an image based on reflection from the mirror.

15. The apparatus of claim 14, wherein the lens is adjusted to increase the focal distance more when the image is captured based on the reflection of the mirror than when the image of the upper half surface is obtained.

* * * * *